(12) United States Patent
Roach

(10) Patent No.: US 8,869,865 B2
(45) Date of Patent: Oct. 28, 2014

(54) HANGING PARTITION AND METHOD

(75) Inventor: Will J. Roach, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 12/861,819

(22) Filed: Aug. 23, 2010

(65) Prior Publication Data

US 2012/0043028 A1    Feb. 23, 2012

(51) Int. Cl.
*A47H 5/00* (2006.01)
*B64D 11/00* (2006.01)

(52) U.S. Cl.
CPC .................................. *B64D 11/0023* (2013.01)
USPC ..................... 160/84.04; 244/118.5

(58) Field of Classification Search
USPC ........ 160/84.04, 368.1, 348, 330, 350, 349.1, 160/349.2, DIG. 16; 244/118.5, 121
See application file for complete search history.

(56) References Cited

U.S. PATENT DOCUMENTS

| | | | |
|---|---|---|---|
| 3,144,274 A | 8/1964 | Harris | |
| 5,524,689 A | 6/1996 | Clark | |
| 2005/0109468 A1* | 5/2005 | Hsu | 160/84.01 |
| 2008/0295283 A1* | 12/2008 | Tice | 16/84 |
| 2009/0242147 A1* | 10/2009 | Breuer et al. | 160/323.1 |
| 2009/0242149 A1* | 10/2009 | Breuer et al. | 160/368.1 |

FOREIGN PATENT DOCUMENTS

| | | | |
|---|---|---|---|
| JP | 11225877 A | * | 8/1999 |
| JP | 200064745 | * | 2/2000 |
| JP | 2004353139 A | * | 12/2004 |

OTHER PUBLICATIONS

Krautli, Florian, "Magnetic Curtain", Jan. 31, 2008, from Internet website at web address http://www.kraeutli.com/index.php/2008/01/31/magnetic-curtain/.
Tatum, Malcolm, "What are Magnetic Curtains?", from Internet website at web address http://www.wisegeek.com/what-are-magnetic-curtains.htm.
Electronic Code of Federal Regulations, Title 14: Aeronautics and Space, Section 25.811 Emergency exit marking., current as of Aug. 19, 2010, from Internet website at web address http://ecfr.gpoaccess.gov.

* cited by examiner

*Primary Examiner* — Katherine Mitchell
*Assistant Examiner* — Scott Denion

(57) ABSTRACT

There is provided a hanging partition. The hanging partition comprises at least one flexible, hanging panel having a plurality of pleats, each pleat having a hemmed portion. The hanging partition further comprises a plurality of magnets positioned within two or more of the hemmed portions. The hanging partition further comprises a plurality of hanging elements for suspending the hanging panel from a longitudinal hanging device. The magnets are aligned with respect to each other to cause a magnetic attraction between adjacent magnets in order to hold the hemmed portions together when the hemmed portions overlap when the hanging partition is in a retracted position.

22 Claims, 15 Drawing Sheets

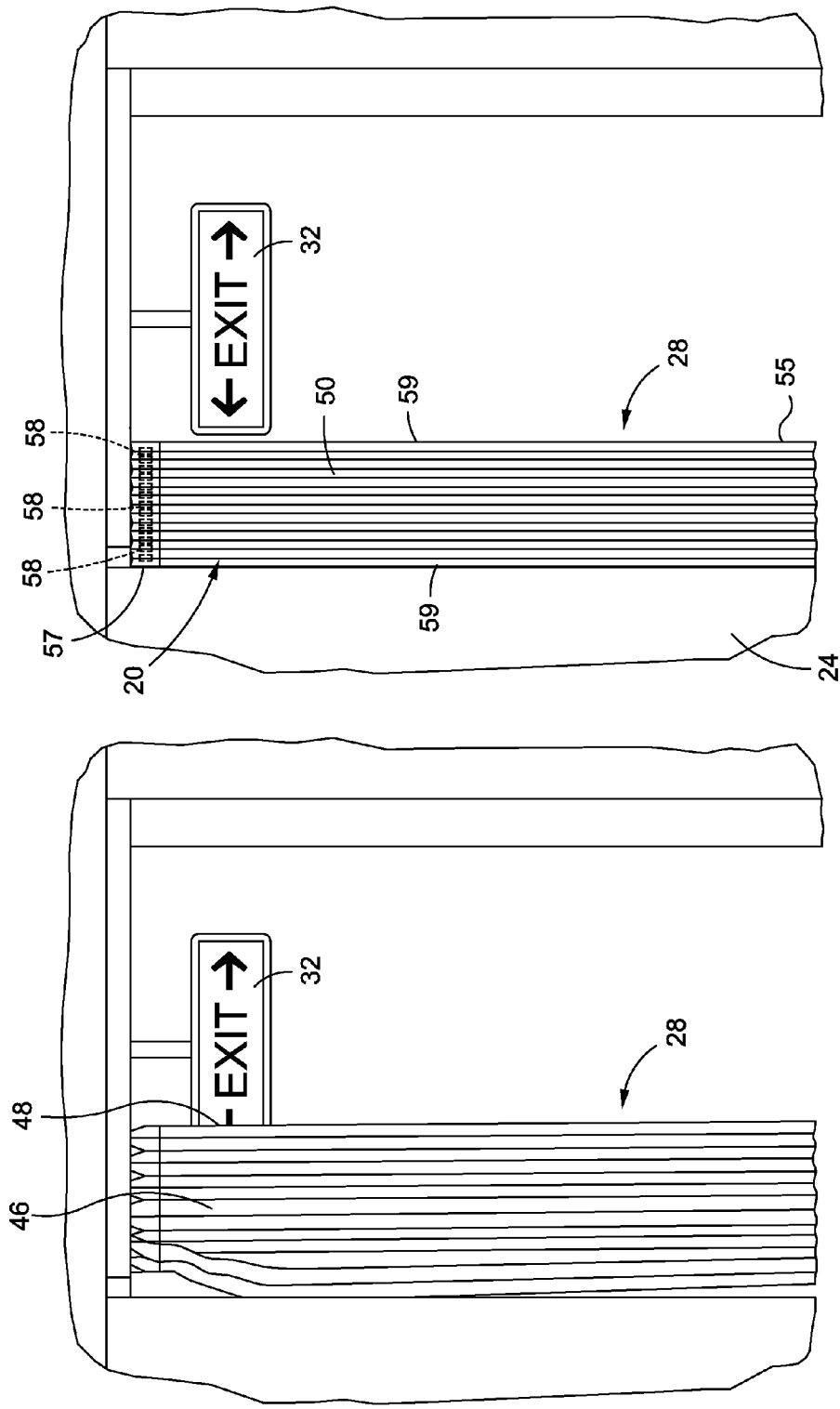

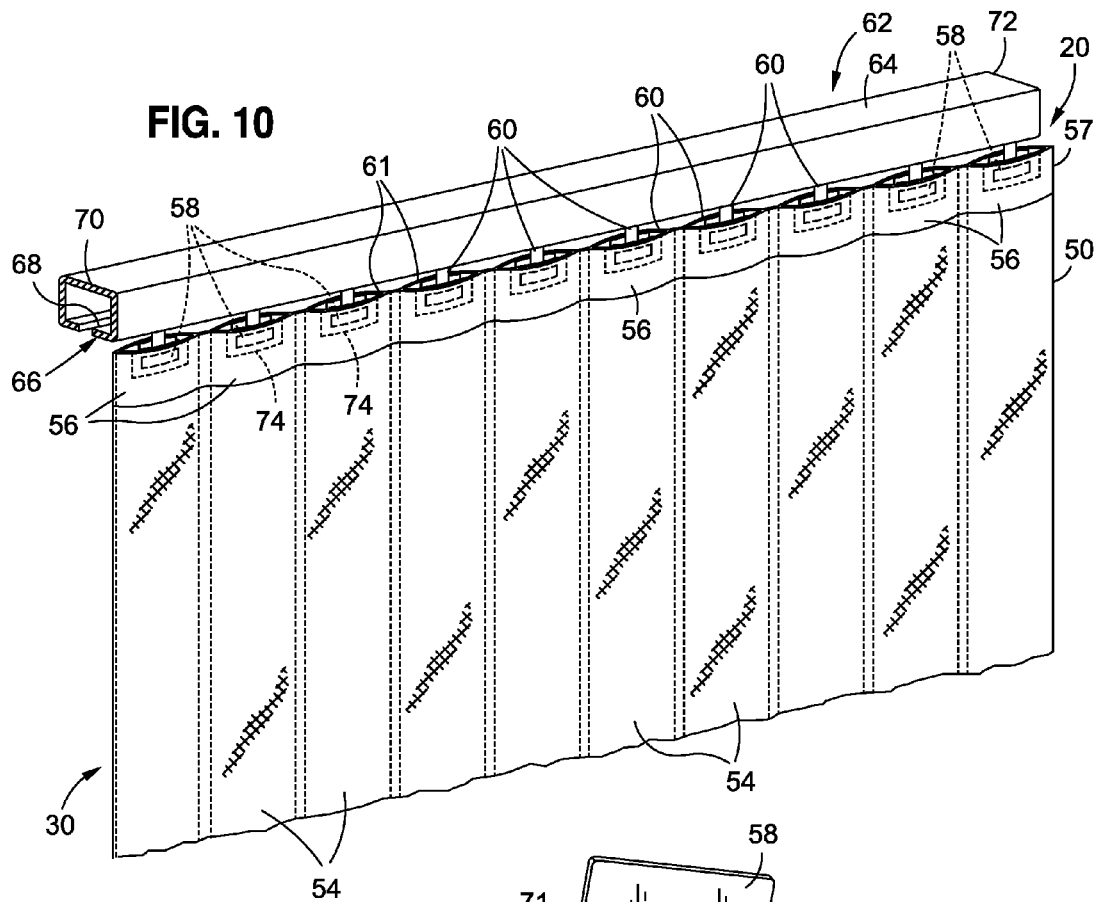
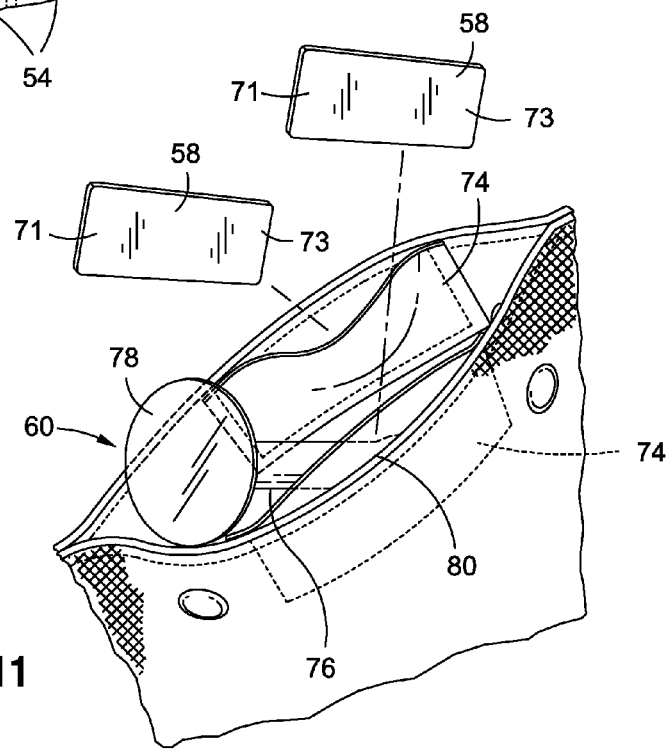

US 8,869,865 B2

HANGING PARTITION AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The disclosure relates generally to hanging partitions for use in vehicles, and more particularly, to hanging partitions, such as curtains, for use in an aircraft.

BACKGROUND

Hanging partitions, such as curtains, drapery, screens, and the like, are used for numerous purposes, including separating or partitioning one physical area from another physical area, blocking unwanted light, and creating areas of privacy. In particular, hanging partitions, such as curtains used in commercial aircraft, can be used to partition one or more areas of a cabin of an aircraft, such as, for example, the first class or business class seating area from the economy class seating area and the passenger seating areas from the flight crew work areas or retreat quarters. Curtains on commercial aircraft are typically in a retracted or pulled back position during landings, take-offs, and stops by the aircraft and are typically in an expanded position during private hours, cruising altitude, and sleeping hours.

Known commercial aircraft curtains are generally long (36 inches to 84 inches in length) and are typically attached to an aircraft curtain rail with glider elements. Such known curtains are typically manually retracted by flight crew members by sliding the glider elements together along the curtain rail or by gathering the middle of the curtain and holding the curtain in place with a tie-back element that either closes with snaps or hook and loop fasteners. In addition, such known curtains often have to be adjusted by flight crew members so that the curtains hang straight and to minimize a wide stack-up of the curtain. This can increase the time and workload of the flight crew members.

Moreover, the ability of such known commercial aircraft curtains to stack up well and hang straight when retracted is important for safety as well as aesthetic reasons. Commercial aircraft are required to display emergency exit locator signs at various locations in the aircraft. Several of the emergency exit locator signs may be in proximity to the aircraft curtains. The Federal Aviation Administration (FAA) Federal Aviation Regulation (FAR) regarding emergency exit markings requires that the location of each passenger emergency exit be indicated by a sign visible to occupants approaching along the main passenger aisle or aisles (See 14 C.F.R. (Code of Federal Regulations) Section 25.811(d)). Known commercial aircraft curtains may hang loosely or have a wide stack-up when the curtains are in a retracted position, and such looseness and wide stack-up can result in obstruction of all or parts of the emergency exit locator signs which, upon inspection, can result in a violation of FAA Section 25.811(d).

In addition, when commercial aircraft experience turbulence, such turbulence can cause known commercial aircraft curtains to expand and have a wide stack-up and cause the glider elements that attach the aircraft curtains to the curtain rail to slide away when the gravity adjusts and expose the inner pleats of the aircraft curtain. Such wide stack-up can result in obstruction of all or parts of the emergency exit locator signs which, upon inspection, can result in a violation of FAA Section 25.811(d).

Accordingly, there is a need in the art for an improved hanging partition and method for use in vehicles such as aircraft that provides advantages over known devices and methods.

SUMMARY

This need for an improved hanging partition and method for use in vehicles such as aircraft is satisfied. In an embodiment of the disclosure, there is provided a hanging partition. The hanging partition comprises at least one flexible, hanging panel having a plurality of pleats, each pleat having a hemmed portion. The hanging partition further comprises a plurality of magnets positioned within two or more of the hemmed portions. The hanging partition further comprises a plurality of hanging elements for suspending the hanging panel from a longitudinal hanging device. The magnets are aligned with respect to each other to cause a magnetic attraction between adjacent magnets in order to hold the hemmed portions together when the hemmed portions overlap when the hanging partition is in a retracted position.

In another embodiment of the disclosure, there is provided a magnetic curtain for partitioning at least two areas in a cabin of an aircraft. The magnetic curtain comprises at least one curtain panel made of a flame resistant material and having a plurality of pleats. Each pleat has an upper hemmed portion and each hemmed portion has at least one pocket. The magnetic curtain further comprises at least one magnet positioned in at least one pocket of each hemmed portion. The magnet is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material. The magnetic curtain further comprises a plurality of glider elements for suspending the curtain panel from a longitudinal curtain rail. Each glider element has a first end coupled to the curtain rail, and each glider element has a second end coupled to the hemmed portion of each pleat via an attachment element. The magnets in adjacent pleats are aligned with respect to each other to cause a magnetic attraction between the adjacent magnets in order to hold the hemmed portions together when the hemmed portions overlap when the magnetic curtain is in a retracted position.

In another embodiment of the disclosure, there is provided a method of assembling a hanging partition. The method comprises providing a hanging panel having a plurality of pleats, each pleat having a hemmed portion. The method further comprises inserting a plurality of magnets within two or more of the hemmed portions. The method further comprises aligning the magnets within the hemmed portions in order to cause a magnetic attraction between adjacent magnets when the hemmed portions overlap when the hanging partition is in a retracted position. The method further comprises attaching to the hanging panel a plurality of hanging elements for suspending the hanging partition from a longitudinal hanging device.

In another embodiment of the disclosure, there is provided a method of assembling a magnetic curtain for partitioning at least two areas in a cabin of an aircraft. The method comprises providing a flame resistant curtain panel having a plurality of pleats, each pleat having an upper hemmed portion and each hemmed portion having at least one pocket. The method further comprises inserting at least one magnet into at least one pocket of each hemmed portion. The method further comprises aligning the magnets within the hemmed portions in order to cause a magnetic attraction between adjacent magnets and in order to automatically stack the hemmed portions together when the hemmed portions overlap when the magnetic curtain is in a retracted position. The method further comprises attaching to the curtain panel a plurality of glider elements for suspending the magnetic curtain from a longitudinal curtain rail, each glider element having a first end coupled to the curtain rail, and each glider element having a second end coupled to the hemmed portion of each pleat via an attachment element.

In another embodiment of the disclosure, there is provided a method for facilitating visibility of one or more emergency exit locator signs in a cabin of an aircraft. The method comprises providing a flame resistant curtain panel having a plurality of pleats, each pleat having an upper hemmed portion and each hemmed portion having at least one pocket that holds one or more magnets. The method further comprises aligning the magnets within the pockets of the hemmed portions in order to cause a magnetic attraction between adjacent magnets when the hemmed portions overlap. The method further comprises suspending the magnetic curtain from a longitudinal curtain rail with a plurality of hanging elements, such that the magnetic curtain partitions at least two areas in the cabin of the aircraft. The method further comprises retracting the magnetic curtain to a retracted position so that the hemmed portions are held together by the magnets, and so that the one or more emergency exit locator signs in the cabin of the aircraft are visible to occupants of the aircraft approaching the one or more emergency exit locator signs along an aisle of the aircraft.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 6 is an illustration of a close-up front view of a prior art aircraft curtain partially obstructing an emergency exit locator sign;

FIG. 7 is an illustration of a close-up front view of one of the embodiments of the hanging partition of the disclosure in a retracted position;

FIG. 10 is an illustration of a close-up perspective view of the upper portion of another embodiment of the hanging partition of the disclosure in an extended position with the magnets positioned in pockets in the pleats;

FIG. 11 is an illustration of a close-up perspective view of the magnets that are positioned in pockets of a pleat;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
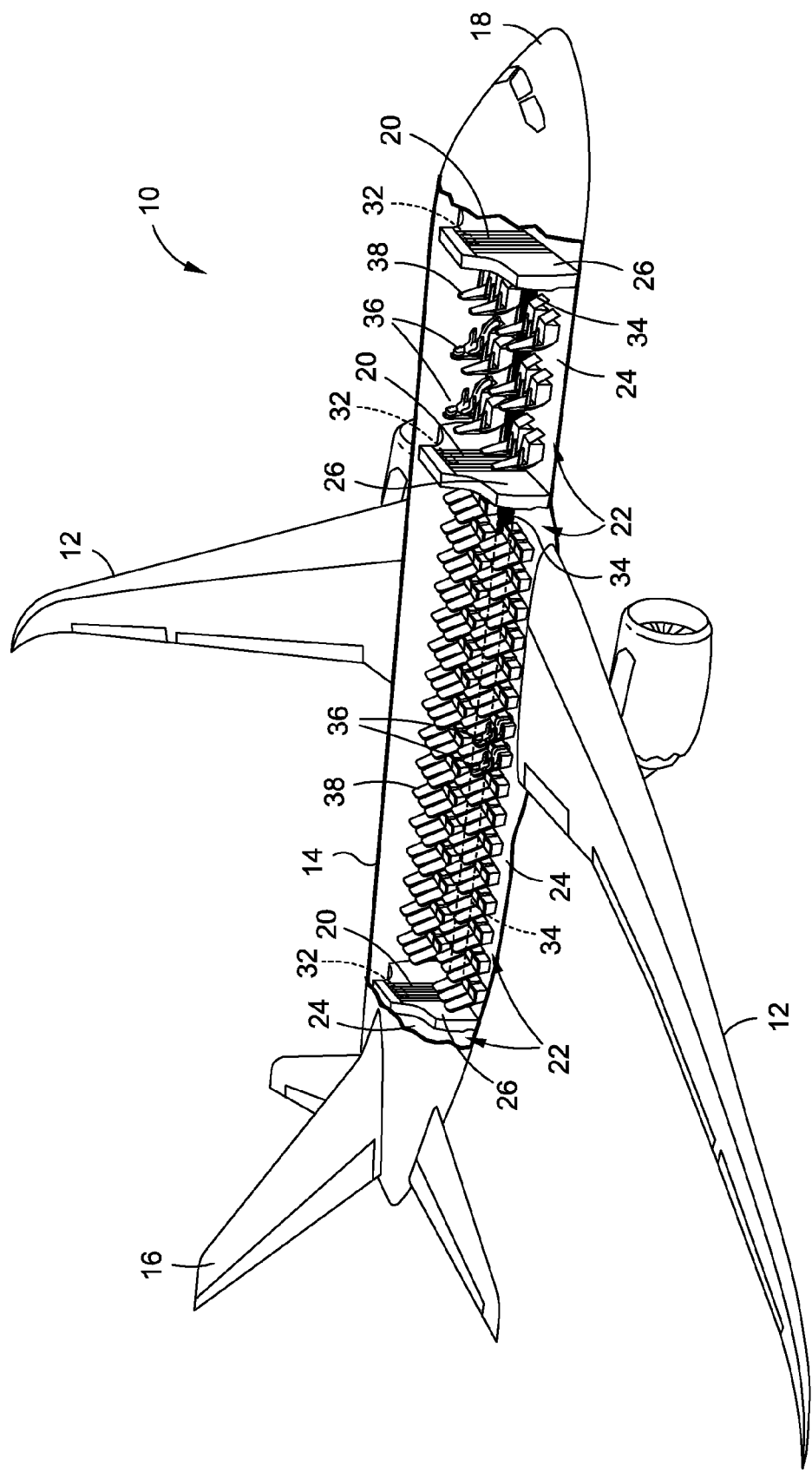
FIG. 1 is an illustration of a perspective view of an aircraft which may incorporate one or more advantageous embodiments of the hanging partition of the disclosure.

FIG. 1 is an illustration of a perspective view of an aircraft 10 which includes such component parts as wings 12, a fuselage 14, a tail 16, and a nose 18. The aircraft 10 may incorporate one or more advantageous embodiments of a hanging partition 20 of the disclosure as discussed in detail below. Although the hanging partition 20 is shown in an exemplary embodiment as used in the aircraft 10, the hanging partition 20 may also be used in other vehicles (not shown), such as rotorcraft, watercraft, trains, buses, recreational vehicles, trucks, and other suitable vehicles or structures.

Figure 2:
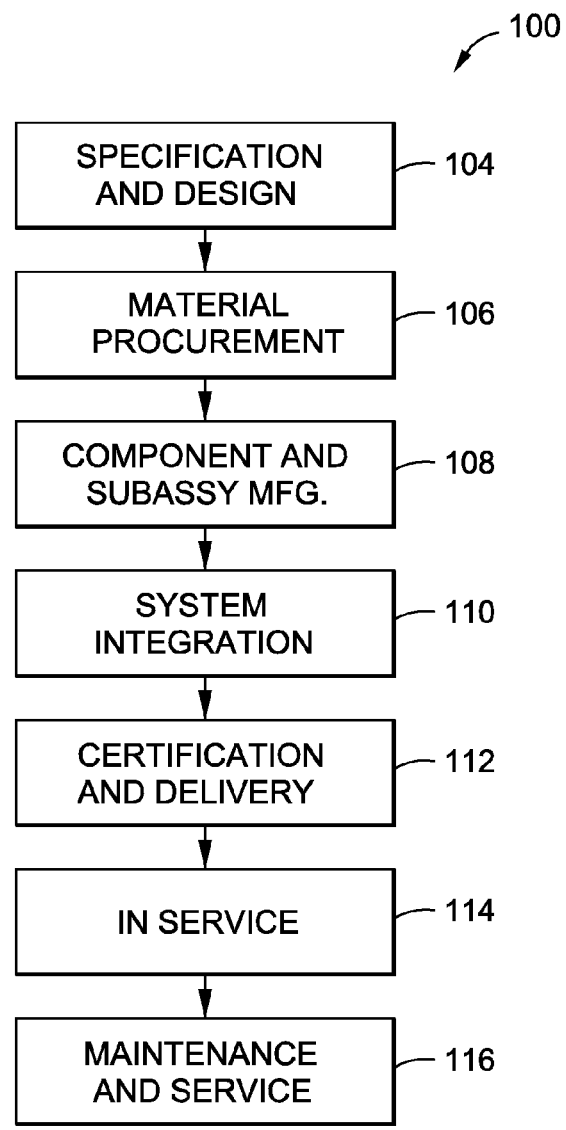
FIG. 2 is an illustration of a flow diagram of an aircraft production and service method.
Figure 3:
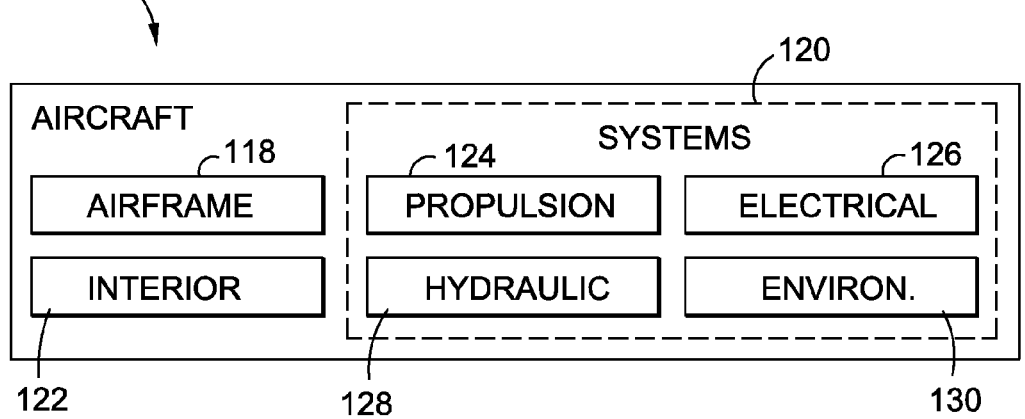
FIG. 3 is an illustration of a functional block diagram of an aircraft.

FIG. 2 is a flow diagram of an aircraft production and service method 100. FIG. 3 is a block diagram of an aircraft 102. Referring to FIGS. 2-3, embodiments of the disclosure may be described in the context of the aircraft manufacturing and service method 100 as shown in FIG. 2 and the aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and other suitable services).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Methods and systems embodied herein may be employed during any one or more of the stages of the production and service method 100. For example, components or subassemblies corresponding to component and subassembly manufacturing 108 may be fabricated or manufactured in a manner similar to components or subassemblies produced while the aircraft 102 is in service. Also, one or more apparatus embodiments, method embodiments, or a combination thereof, may be utilized during component and subassembly manufacturing 108 and system integration 110, for example, by substantially expediting assembly of or reducing the cost of the aircraft 102. Similarly, one or more of apparatus embodiments, method embodiments, or a combination thereof, may be utilized while the aircraft 102 is in service, for example and without limitation, to maintenance and service 116.

Figure 4:
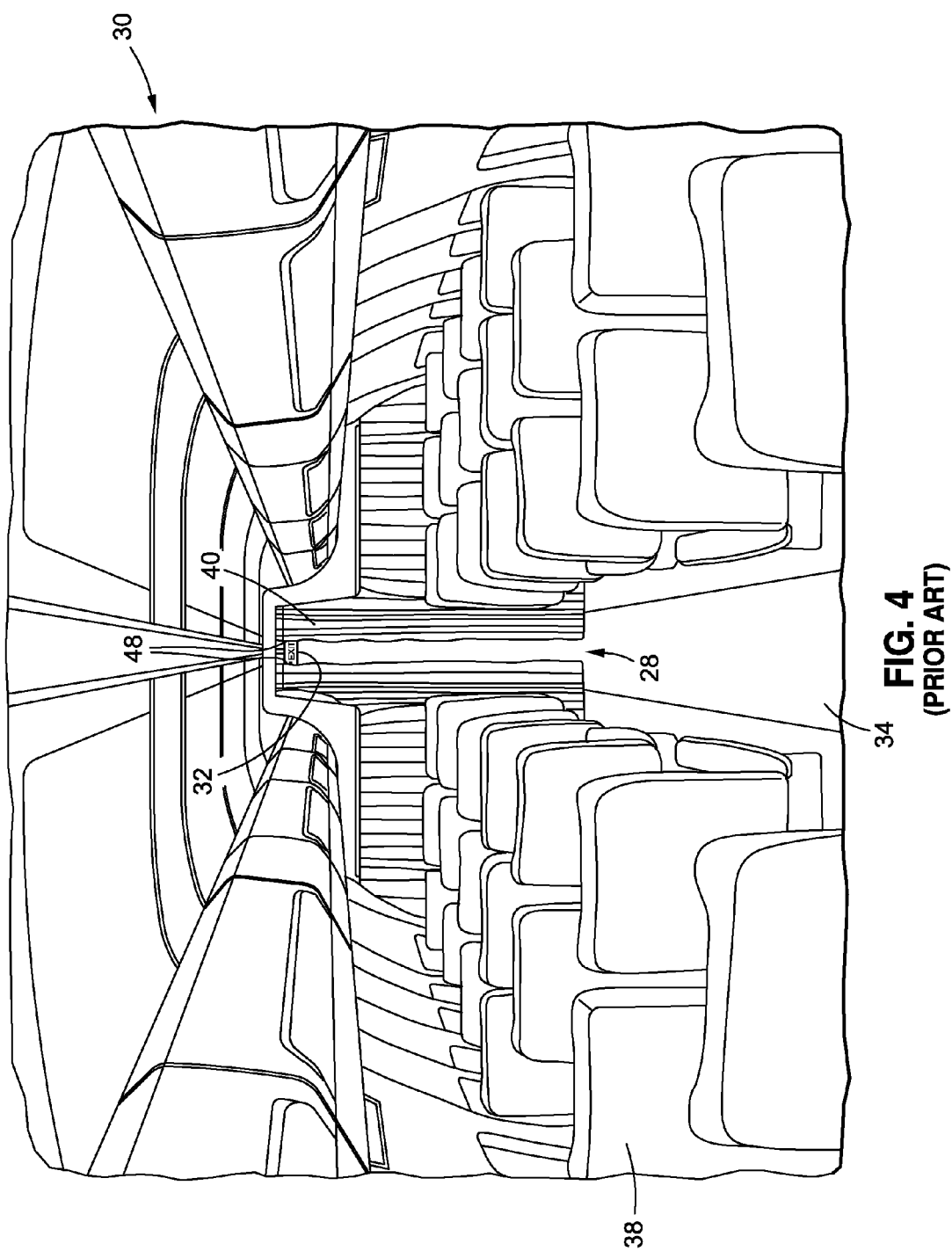
FIG. 4 is an illustration of a prior art aircraft curtain partially obstructing an emergency exit locator sign.
Figure 5:
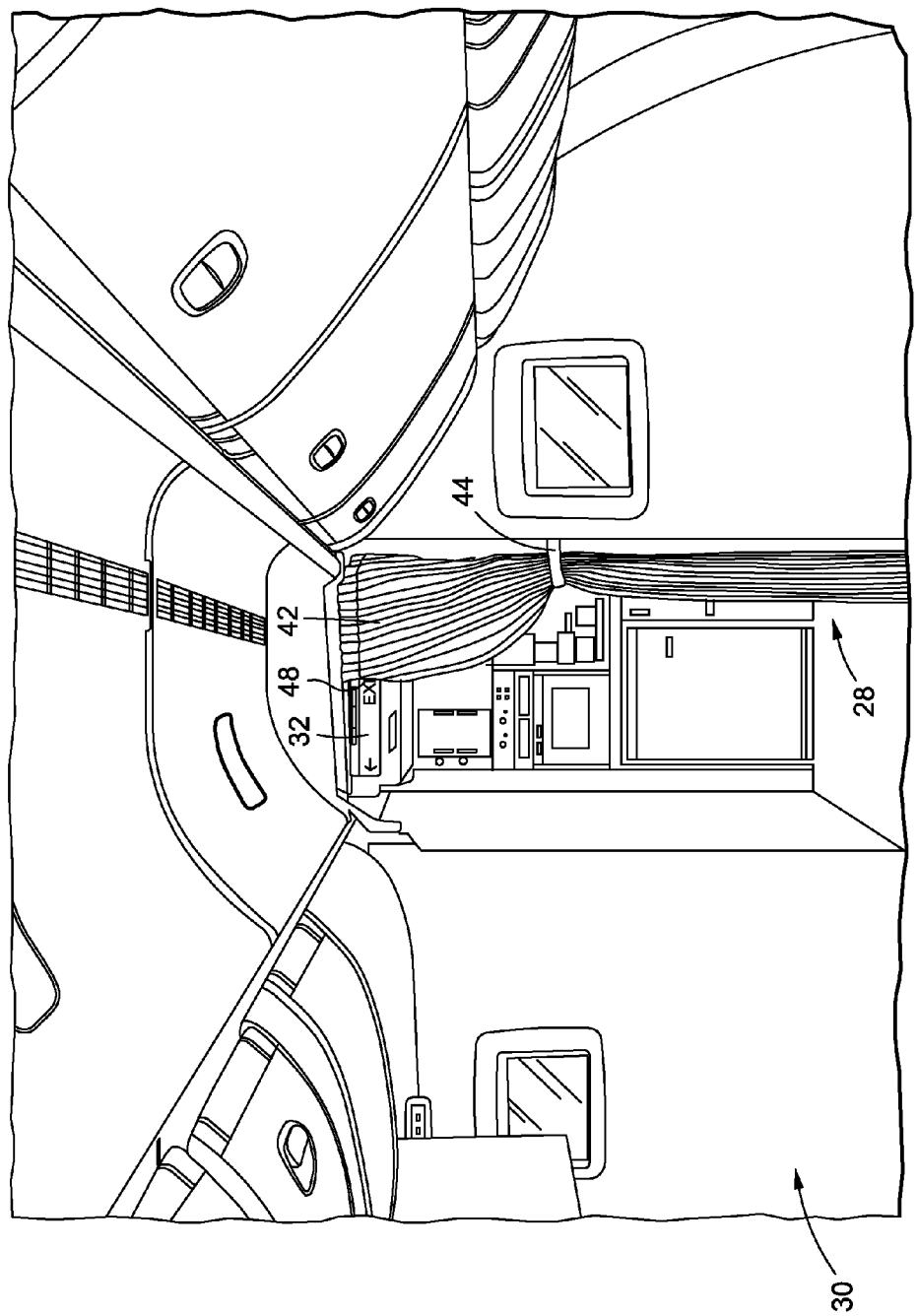
FIG. 5 is an illustration of another prior art aircraft curtain partially obstructing an emergency exit locator sign.

FIG. 4 is an illustration of a prior art aircraft curtain 40 shown partially obstructing a portion 48 of an emergency exit locator sign 32 when the aircraft curtain 40 is in a retracted position 28. FIG. 5 is an illustration of another prior art aircraft curtain 42 having a tie-back element 44 where the aircraft curtain 42 is shown partially obstructing portion 48 of the emergency exit locator sign 32 when the aircraft curtain 42 is in retracted position 28. FIG. 6 is an illustration of a close-up front view of a prior art aircraft curtain 46 shown partially obstructing portion 48 of the emergency exit locator sign 32 when the aircraft curtain 46 is in retracted position 28.

FIG. 7 is an illustration of a close-up front view of one of the embodiments of the hanging partition 20 of the disclosure in the retracted position 28. Preferably, the hanging partition 20 is in the form of a curtain 50. However, the hanging partition 20 may also comprise drapery, a screen, or another suitable form. Preferably, the material used for the hanging partition 20 is FAA (Federal Aviation Administration) approved and has passed ASTM-84E Surface Burning Test or UL-94VO Flammability Test. Preferably, the hanging partition 20 is made of an FAA approved material comprising a flame resistant fabric material such as a flame resistant wool material, a flame resistant polyester material, a flame resistant nylon material, or another suitable flame resistant material. Preferably, the hanging partition 20 partitions at least two cabin areas 24 in a cabin 22 of a vehicle such as aircraft 10 (see FIG. 1). When the hanging partition 20 is in the retracted position 28, the hanging partition 20 does not obstruct an emergency exit locator sign 32 that may be in close proximity to the hanging partition 20 in the aircraft 10. Typically, the emergency exit locator signs 32 are suspended overhead and behind the hanging partition 20 in the aircraft 10 or in another location of close proximity.

Figure 9:
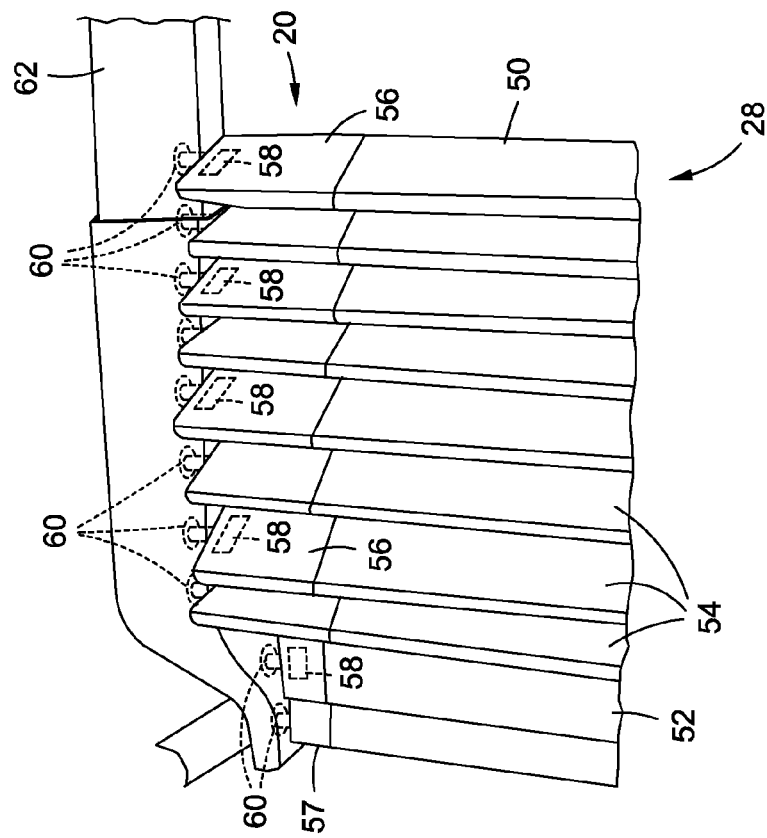
FIG. 9 is an illustration of a close-up perspective view of the upper portion of another embodiment of the hanging partition of the disclosure in a retracted position with magnets positioned in alternating pleats.
Figure 8:
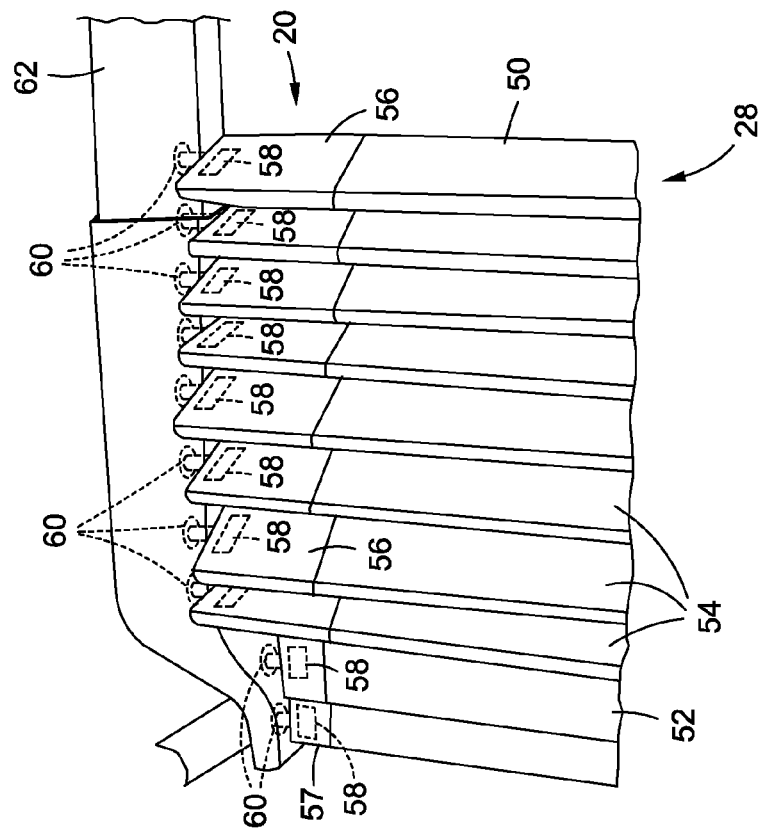
FIG. 8 is an illustration of a close-up perspective view of the upper portion of one of the embodiments of the hanging partition of the disclosure in a retracted position with magnets positioned in every pleat.

As shown in FIG. 8, the hanging partition 20 comprises at least one flexible hanging panel 52 having a plurality of pleats 54. Each pleat 54 has a hemmed portion 56. The hanging panel 52 has a lower portion 55, an upper portion 57, and side portions 59 (see FIG. 7). Preferably, the hemmed portions 56 are positioned along the upper portion 57 of the hanging panel 52. A plurality of magnets 58 are positioned within two or more of the hemmed portions 56. Preferably, each hemmed portion 56 holds one or more magnets 58 (see FIG. 8). However, as shown in FIG. 9, the magnets 58 may be positioned in alternating hemmed portions 56 of the pleats 54 or in randomly selected hemmed portions 56 of the pleats 54, depending on the strength of attraction between adjacent or succeeding magnets 58 and depending on the weight and thickness of the material or fabric used for the hanging panel 52. Whether the magnets are in every pleat or every other pleat or in random pleats depends on the strength of attraction between the adjacent or succeeding magnets based on the variation of thickness and fabric of the hanging panel of the hanging partition 20.

It is desirable to use magnets in the hanging partition 20 having a magnetic field that does not interfere with any electrical or electronic systems on the aircraft 10. The number of magnets 58 needed preferably equals the distance necessary for the maximum attraction between adjacent or succeeding magnets 58 in succession in the hemmed portions 56. Each hemmed portion 56 may further comprise at least one pocket 74 (see FIG. 11) for holding the one or more magnets 58. The magnets 58 are preferably hidden in the hemmed portions 56 of the pleats 54 of the hanging partition 20 to maintain an aesthetically pleasing visual look to the hanging partition 20.

FIG. 8 is an illustration of a close-up perspective view of the upper portion 57 of one of the embodiments of the hanging partition 20 of the disclosure in the retracted position 28 with the magnets 58 positioned in every pleat 54. FIG. 9 is an illustration of a close-up perspective view of the upper portion 57 of another embodiment of the hanging partition 20 of the disclosure in the retracted position 28 with the magnets 58 positioned in alternating pleats 54. FIG. 10 is an illustration of a close-up perspective view of the upper portion 57 of another embodiment of the hanging partition 20 of the disclosure in an extended position 30 with the magnets 58 positioned in the pockets 74 in the pleats 54. FIG. 11 is an illustration of a close-up perspective view of the magnets 58 that are positioned in the pockets 74 of the pleat 54.

Figure 13:
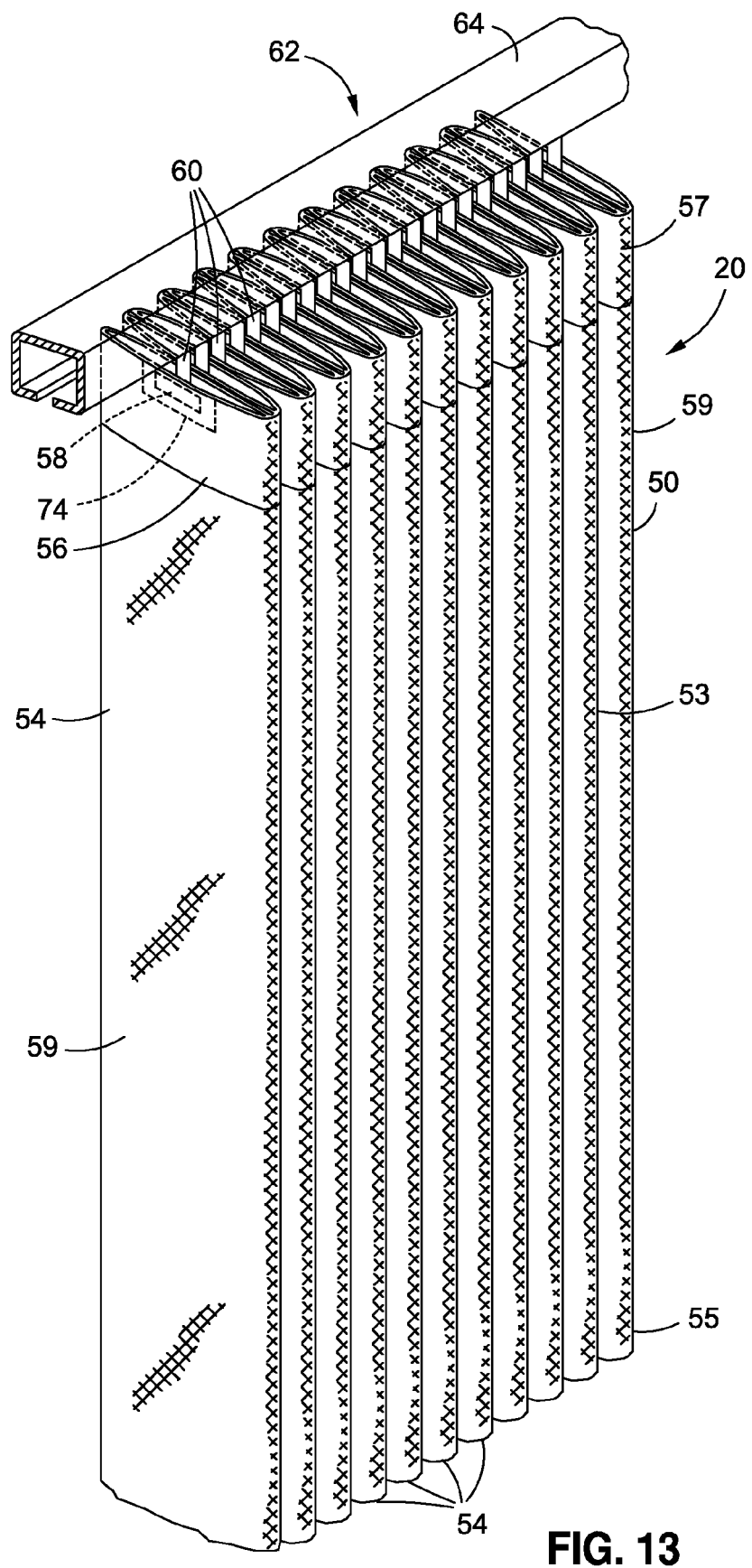
FIG. 13 is an illustration of a perspective view of one of the embodiments of the hanging partition of the disclosure in a retracted position having magnets positioned in pockets in the pleats.

The magnets 58 are preferably aligned or arranged with respect to each other so as to cause a magnetic attraction between adjacent or succeeding magnets 58 in order to hold the hemmed portions 56 together when the hemmed portions 56 overlap and when the hanging partition 20 is in the retracted position 28. As shown in FIG. 13, the magnets 58 are also preferably aligned or arranged with respect to each other in order to automatically stack the hemmed portions 56 together when the hanging partition 20 is in the retracted position 28. As shown in FIG. 11, each magnet 58 has a north pole surface 71 and a south pole surface 73. The magnets 58 must be aligned with respect to each other such that the north pole surface 71 of one magnet 58 is aligned with the south pole surface 73 of the adjacent magnet 58 so as not to repel each other.

The magnets 58 may comprise an FAA approved magnetic material such as neodymium, neodymium iron boron, hard ferromagnetic material, samarian cobalt, alnico, ceramic, ferrite, iron, nickel, alloys of rare earth metals, or another suitable FAA approved magnetic material. Preferably, the magnets 58 comprise neodymium. An example of a suitable type of magnet that may be used in the hanging partition 20 of the disclosure includes a neodymium rectangle magnet obtained from Adams Magnetic Products Co. of Elmhurst, Ill., having dimensions of 0.055 inch thick by 0.5 inch wide by 1.00 inch long and having a weight of 0.125 pounds.

Figure 15A:
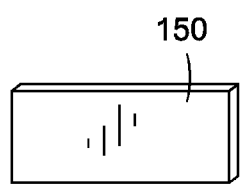
FIG. 15A is an illustration of one embodiment of a magnet in the form of a rectangle that may be used in the hanging partition of the disclosure.
Figure 15B:
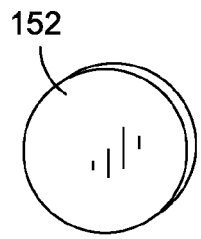
FIG. 15B is an illustration of one embodiment of a magnet in the form of a disk that may be used in the hanging partition of the disclosure.
Figure 15C:
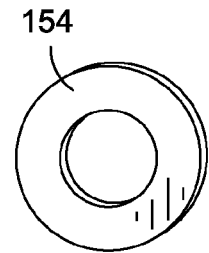
FIG. 15C is an illustration of one embodiment of a magnet in the form of a donut that may be used in the hanging partition of the disclosure.
Figure 15D:
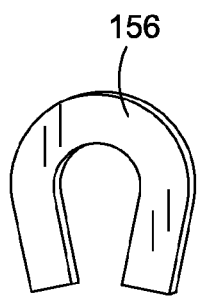
FIG. 15D is an illustration of one embodiment of a magnet in the form of a horseshoe that may be used in the hanging partition of the disclosure.
Figure 15E:
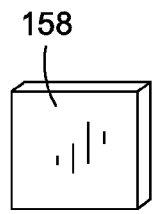
FIG. 15E is an illustration of one embodiment of a magnet in the form of a square that may be used in the hanging partition of the disclosure.
Figure 15F:
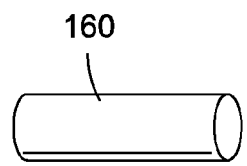
FIG. 15F is an illustration of one embodiment of a magnet in the form of a cylinder that may be used in the hanging partition of the disclosure.
Figure 15G:
FIG. 15G is an illustration of one embodiment of a magnet in the form of a ball that may be used in the hanging partition of the disclosure.
Figure 15H:
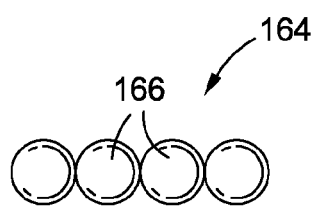
FIG. 15H is an illustration of one embodiment of a magnet in the form of a string of beads that may be used in the hanging partition of the disclosure.
Figure 15I:
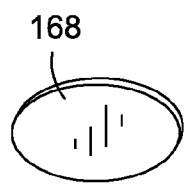
FIG. 15I is an illustration of one embodiment of a magnet in the form of a oval that may be used in the hanging partition of the disclosure.

FIGS. 15A-15I show various magnet configurations that may be used for the magnets 58 used with the hanging partition 20. However, other suitable configurations may also be used. FIG. 15A is an illustration of one embodiment of a magnet 58 in the form of a rectangle 150 that may be used in the hanging partition 20 of the disclosure. FIG. 15B is an illustration of one embodiment of a magnet 58 in the form of a disk 152 that may be used in the hanging partition 20 of the disclosure. FIG. 15C is an illustration of one embodiment of a magnet 58 in the form of a donut 154 that may be used in the hanging partition 20 of the disclosure. FIG. 15D is an illustration of one embodiment of a magnet 58 in the form of a horseshoe 156 that may be used in the hanging partition 20 of the disclosure. FIG. 15E is an illustration of one embodiment of a magnet 58 in the form of a square 158 that may be used in the hanging partition 20 of the disclosure. FIG. 15F is an illustration of one embodiment of a magnet 58 in the form of a cylinder 160 that may be used in the hanging partition 20 of the disclosure. FIG. 15G is an illustration of one embodiment of a magnet 58 in the form of a ball 162 that may be used in the hanging partition 20 of the disclosure. FIG. 15H is an illustration of one embodiment of a magnet 58 in the form of a string 164 of beads 166 that may be used in the hanging partition 20 of the disclosure. FIG. 15I is an illustration of one embodiment of a magnet 58 in the form of an oval 168 that may be used in the hanging partition 20 of the disclosure.

Figure 12:
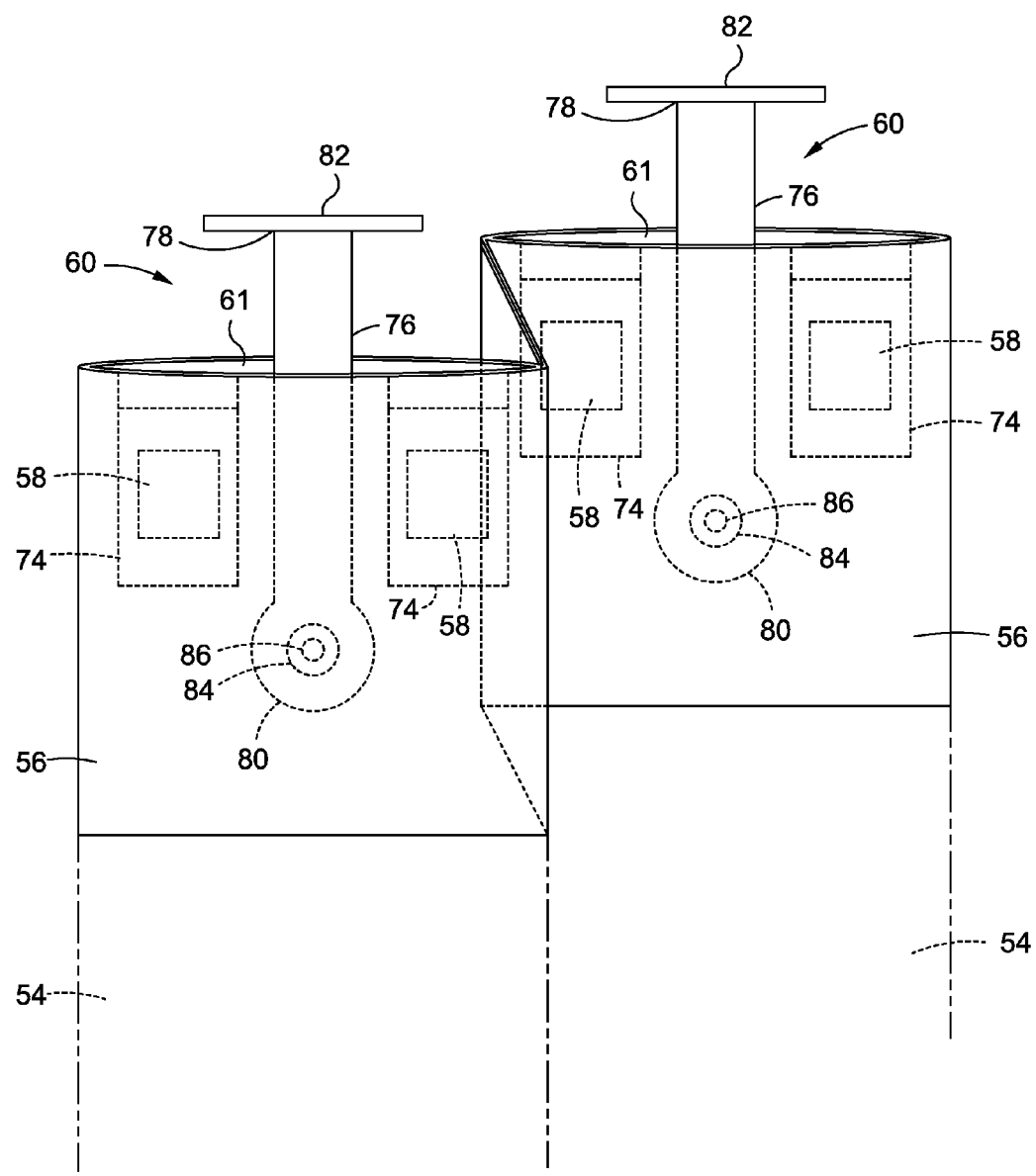
FIG. 12 is an illustration of a close-up plan view of the hanging element attached to the pleat with the magnets on each side of the hanging element.

FIG. 12 is an illustration of a close-up plan view of hanging element 60 attached to the pleat 54 with the magnets 58 on each side of the hanging element 60. As shown in FIG. 12, the hanging partition 20 further comprises a plurality of hanging elements 60 for suspending the hanging panel 52 from a longitudinal hanging device 62. Preferably, the hanging element 60 comprises a glider element 76. Preferably, the glider element 76 is of a unitary, continuous configuration and is formed of a rigid plastic material such as nylon 6/6 (polyhexamethylene adiptimide). However, the glider element may also be formed of any natural or man-made material, such as a substantially rigid material or a flexible plastic, metal, wood, or another suitable material. Preferably, the hanging element 60 is formed of a material having a tensile strength greater than the tear strength of the hanging panel 52. Each hanging element 60 has a first end 78 coupled to the curtain rail 64 of the hanging device 62. The first end 78 may comprise a head portion 82. Each hanging element 60 has a second end 80 coupled to the hemmed portion 56 of each pleat 54 via an attachment element 84. The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element.

Figure 14:
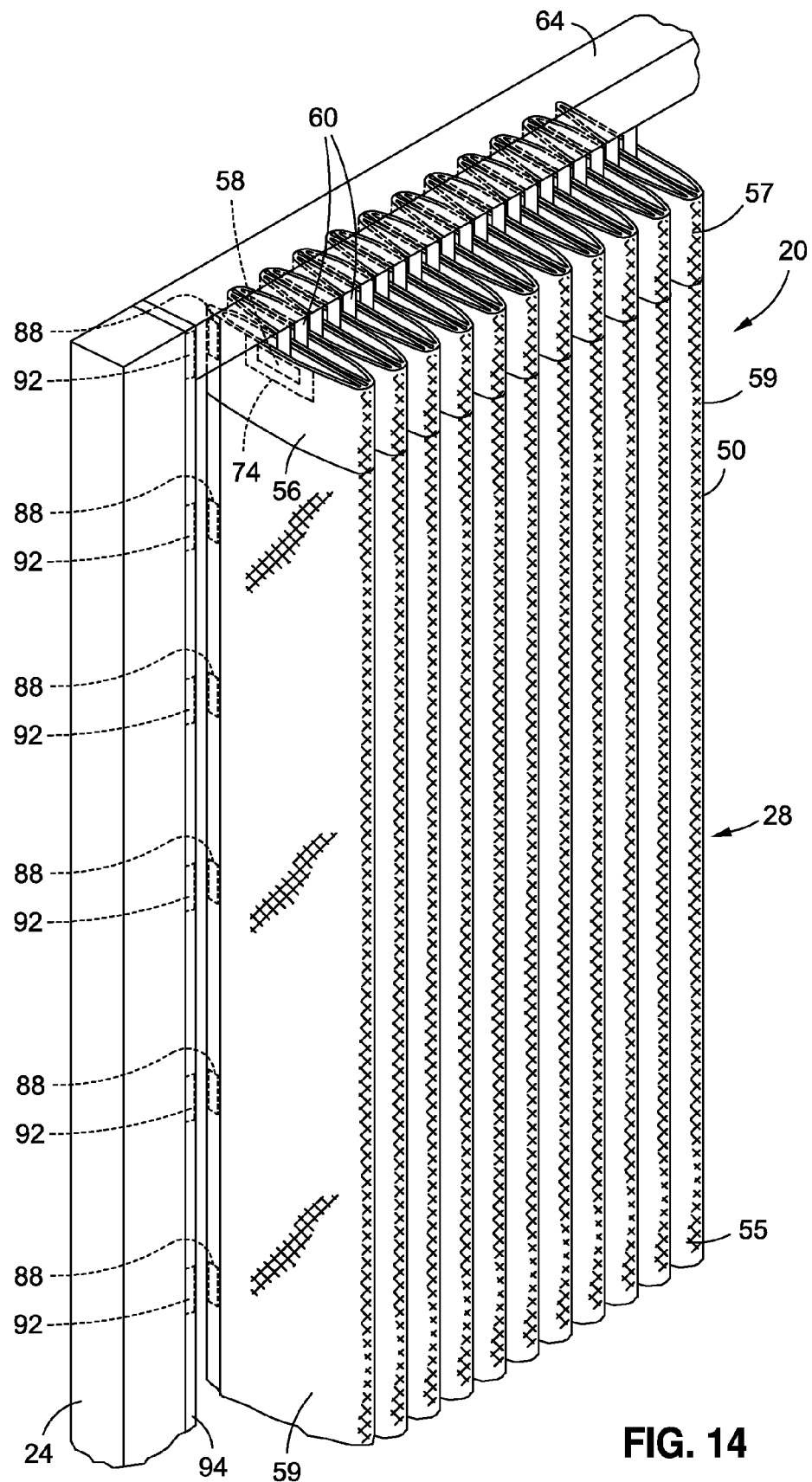
FIG. 14 is an illustration of a perspective view of another embodiment of the hanging partition of the disclosure in a retracted position and having side magnets coupled to a side rail.

FIG. 14 is an illustration of a perspective view of another embodiment of the hanging partition 20 in the retracted position 28 and having additional side magnets 88 that may be coupled to a side rail 94 of the aircraft 10 (not shown). As shown in FIG. 14, one of the side portions 59 of the hanging partition 20 may comprise one or more side magnets 88 having a surface that is attracted to and is designed to couple to one or more corresponding magnetic portions 92 on the side rail 94 of a partitioning wall 26, such as partitioning wall 26 in aircraft 10 (see FIG. 1). The magnetic portions 92 may comprise a ferrous material, a corresponding side rail magnet, or another suitable magnetic material.

Figure 16:
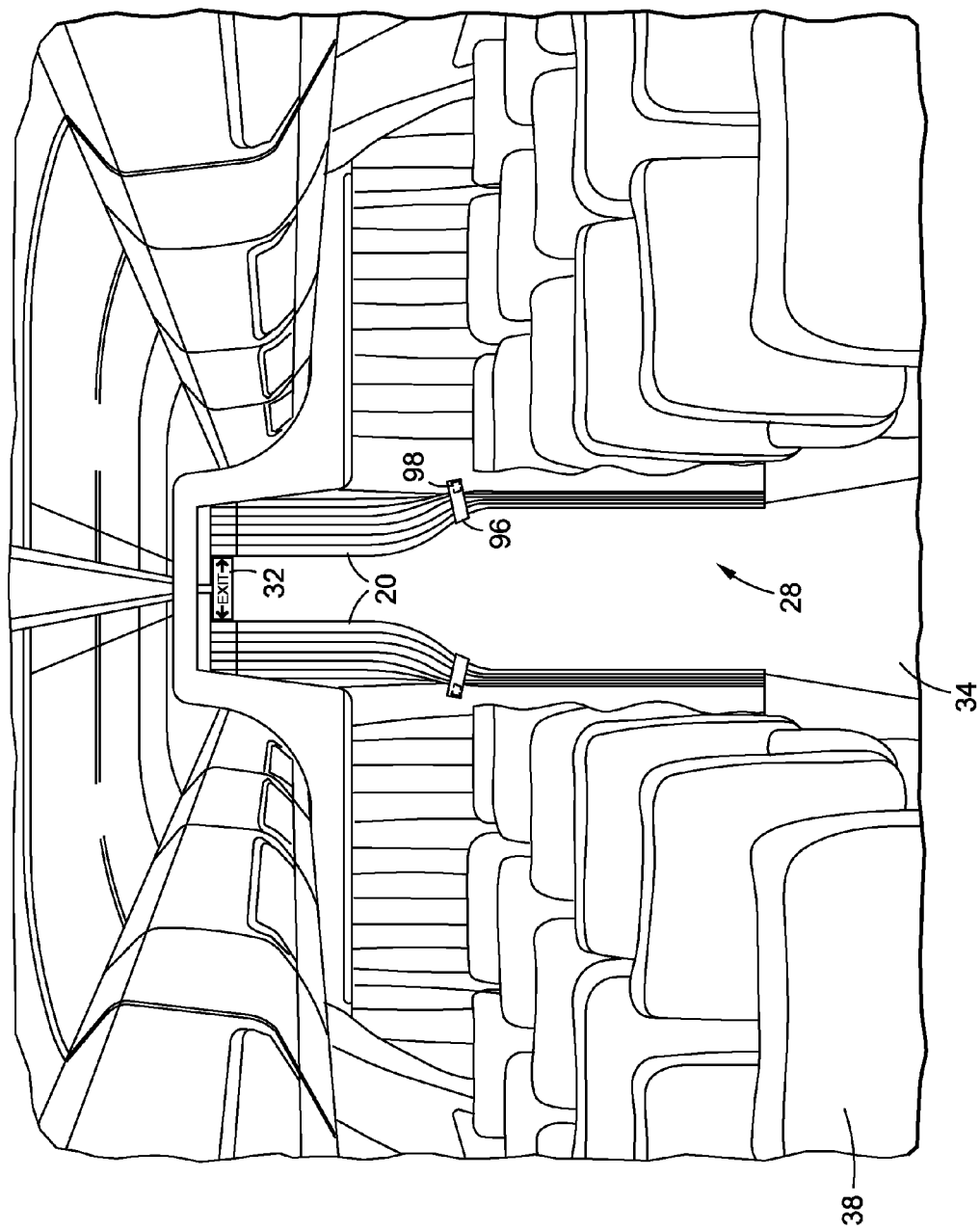
FIG. 16 is an illustration of a perspective view of another embodiment of the hanging partition of the disclosure in a retracted position and having magnetic tie-backs.

As shown in FIG. 16, in another embodiment, the hanging partition 20 may further comprise one or more magnetic tie-back elements 96 having one or more magnets 98 to tie back the hanging panel 52 in the retracted position 28. FIG. 16 is an illustration of a perspective view of the hanging partition 20 in the retracted position 28 and having the magnetic tie-back elements 96 with one or more magnets 98.

FIG. 13 is an illustration of a perspective view of another embodiment of the hanging partition 20, in the form of magnetic curtain 50, in the retracted position 28 and having the magnets 58 positioned in the pockets 74 in the hemmed portions 56 of the pleats 54. The magnetic curtain 50 is preferably used for partitioning at least two cabin areas 24 in the cabin 22 of an aircraft 10 (see FIG. 1). As shown in FIG. 13, the magnetic curtain 50 comprises at least one curtain panel 53 made of a flame resistant material and having a plurality of pleats 54. Each pleat 54 has a hemmed portion 56 in an upper portion 57 of the curtain panel 53, and each hemmed portion 54 has at least one pocket 74. The magnetic curtain 50 further comprises at least one magnet 58 positioned in at least one pocket 74 of each hemmed portion 56. The magnet 58 is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material. The magnetic curtain 50 further comprises a plurality of hanging elements 60, preferably in the form of glider elements 76, for suspending the curtain panel 53 from a longitudinal curtain rail 64 of the hanging device 62. Each glider element 76 has a first end 78 coupled to the curtain rail 64, and each glider element 76 has a second end 80 coupled to the hemmed portion 56 of each pleat 54 via an attachment element 84. The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element. The magnets 58 in adjacent pleats 54 are aligned with respect to each other to cause or create a magnetic attraction between the adjacent magnets 58 in order to hold the hemmed portions 56 together when the hemmed portions 56 overlap and when the magnetic curtain 50 is in the retracted position 28.

Figure 17:
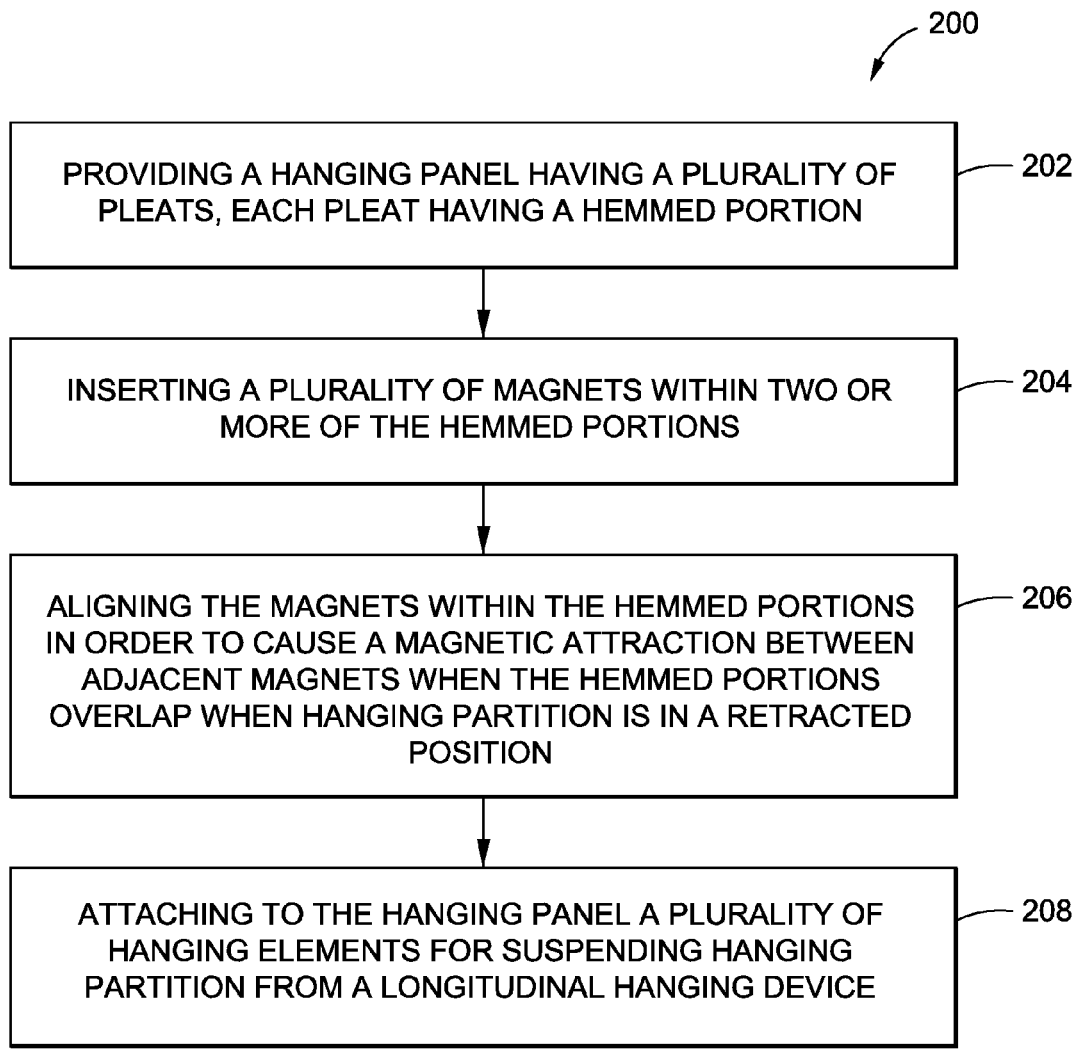
FIG. 17 is an illustration of a flow diagram of an embodiment of a method of the disclosure.

In another embodiment of the disclosure, there is provided a method 200 of assembling a hanging partition 20 (see FIG. 17). FIG. 17 is an illustration of a flow diagram of the method 200 of the disclosure. The method 200 comprises step 202 of providing a hanging panel 52 having a plurality of pleats 54, each pleat 54 having a hemmed portion 56 (see FIG. 10). The method 200 further comprises step 204 of inserting a plurality of magnets 58 within two or more of the hemmed portions 56 (see FIG. 10). The method 200 further comprises step 206 of aligning the magnets 58 within the hemmed portions 56 in order to cause or create a magnetic attraction between adjacent magnets 58, when the hemmed portions 56 overlap and when the hanging partition 20 is in the retracted position 28 (see FIG. 8-9, 13). The method 200 further comprises step 208 of attaching to the hanging panel 52 a plurality of hanging elements 60 for suspending the hanging partition 20 from a longitudinal hanging device 62 (see FIG. 10).

Figure 18:
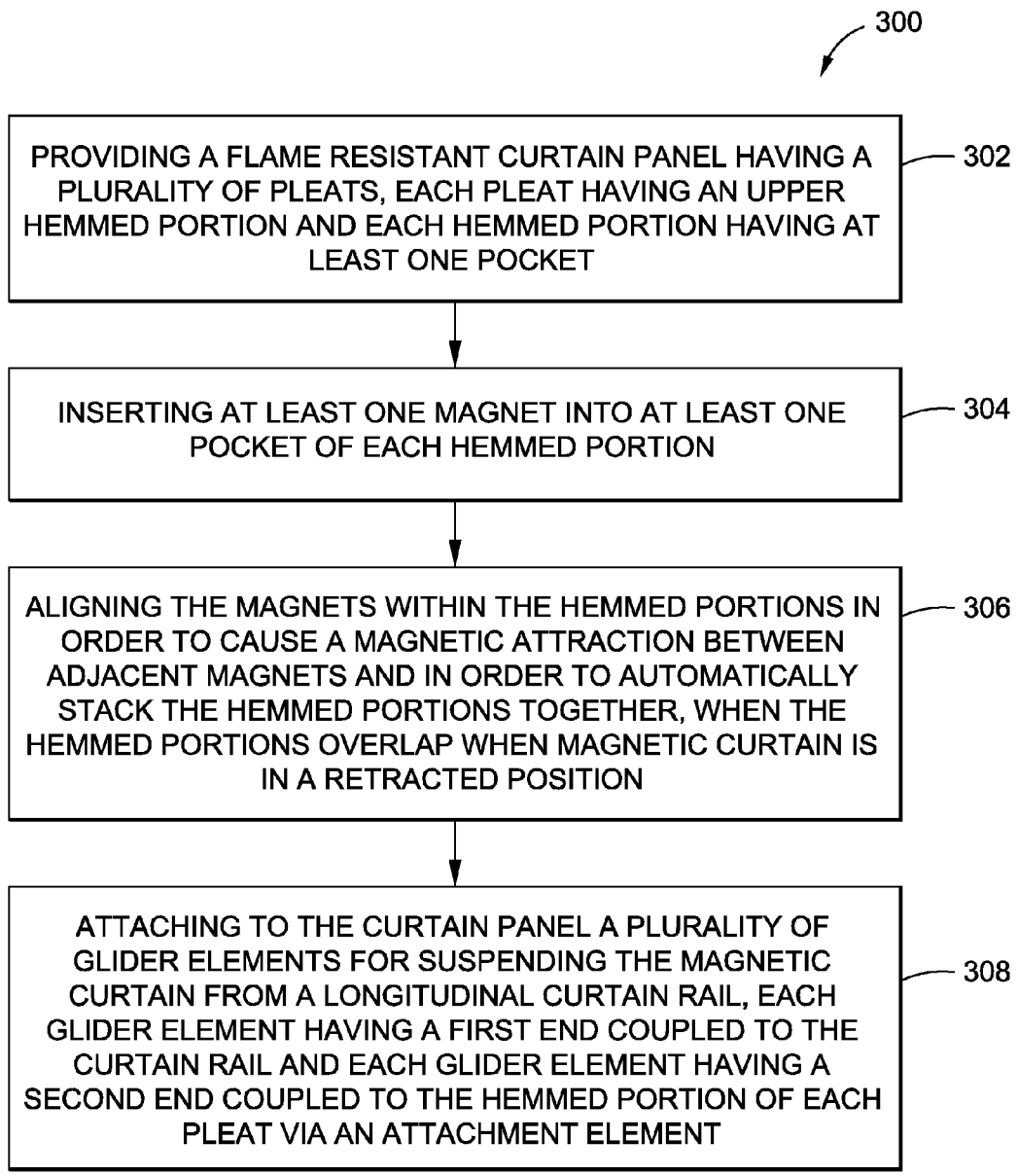
FIG. 18 is an illustration of a flow diagram of another embodiment of a method of the disclosure; and, FIG. 19 is an illustration of a flow diagram of another embodiment of a method of the disclosure.

In another embodiment of the disclosure, there is provided a method 300 of assembling a magnetic curtain 50 for partitioning at least two cabin areas 24 in a cabin 22 of an aircraft 10 (see FIGS. 1, 13). FIG. 18 is an illustration of a flow diagram of the method 300 of the disclosure. The method 300 comprises step 302 of providing a flame resistant curtain panel 53 having a plurality of pleats 54, each pleat 54 having a hemmed portion 56 in the upper portion 57 of the curtain panel 53, and each hemmed portion 56 having at least one pocket 74 (see FIG. 13). The method 300 further comprises step 304 of inserting at least one magnet 58 into at least one pocket 74 of each hemmed portion 56 (see FIG. 13). The method 300 further comprises step 306 of aligning the magnets 58 within the hemmed portions 56 in order to cause or create a magnetic attraction between adjacent magnets 58 and in order to automatically stack the hemmed portions 56 together, when the hemmed portions 56 overlap and when the magnetic curtain 50 is in the retracted position 28 (see FIG. 13). The method 300 further comprises step 308 of attaching to the curtain panel 53 a plurality of glider elements 76 for suspending the magnetic curtain 50 from a longitudinal curtain rail 64 (see FIGS. 12-13). Each glider element 76 has a first end 78 coupled to the curtain rail 64, and each glider element 76 has a second end 80 coupled to the hemmed portion 56 of each pleat 54 via an attachment element 84 (see FIG. 12). The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element.

Figure 19:
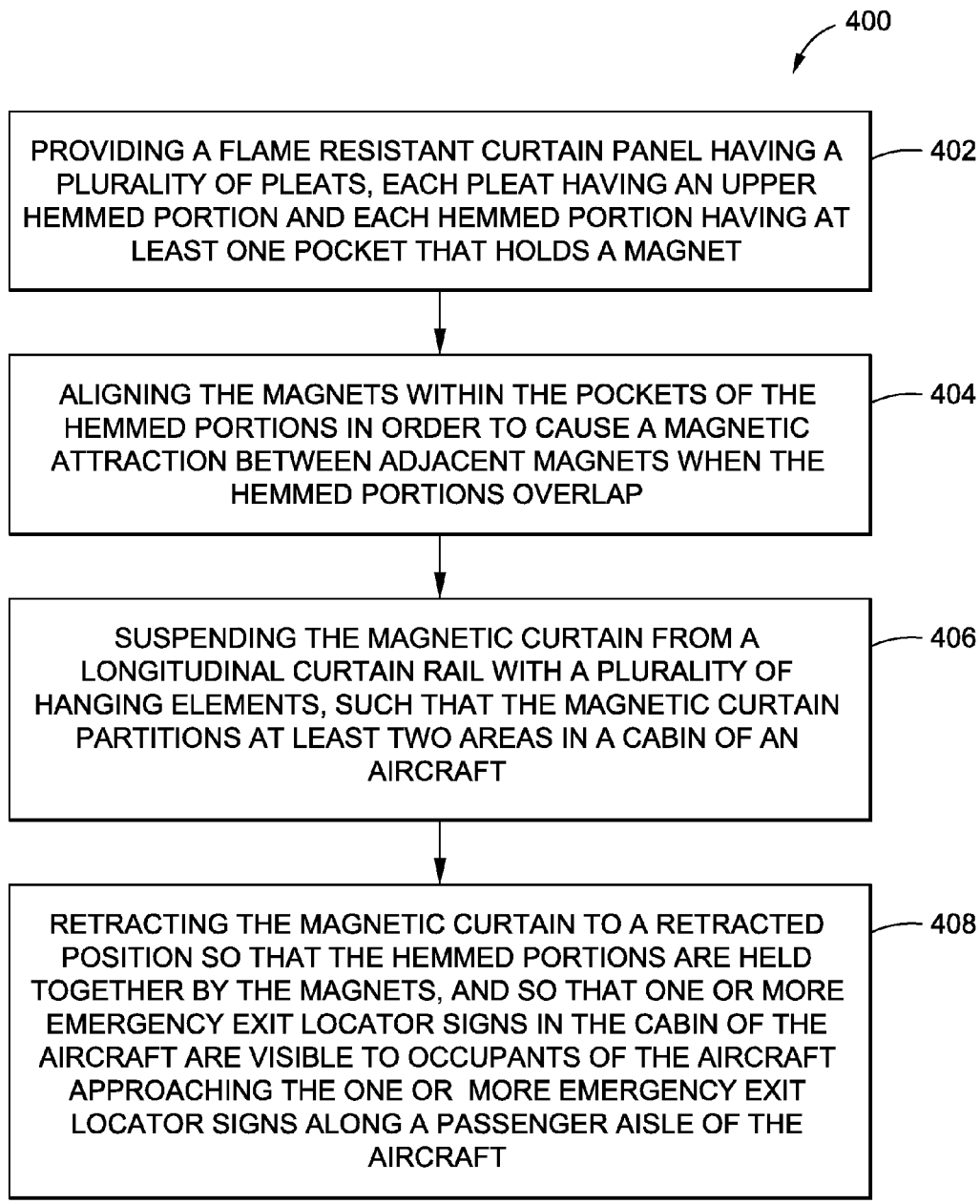

In another embodiment of the disclosure, there is provided a method 400 for facilitating visibility of one or more emergency exit locator signs 32 in a cabin 22 of an aircraft 10 (see FIG. 1). FIG. 19 is an illustration of a flow diagram of the method 400 of the disclosure. The method 400 comprises step 402 of providing a flame resistant curtain panel 53 having a plurality of pleats 54, each pleat 54 having a hemmed portion 56 in the upper portion 57 of the curtain panel 53, and each hemmed portion 56 having at least one pocket 74 that holds one or more magnets 58. The method 400 further comprises step 404 of aligning the magnets 58 within the pockets 74 of the hemmed portions 56 in order to cause or create a magnetic attraction between adjacent magnets 58 when the hemmed portions 56 overlap. The method 400 further comprises step 406 of suspending the magnetic curtain 50 from a longitudinal curtain rail 64 with a plurality of hanging elements 60, such that the magnetic curtain 50 partitions at least two cabin areas 24 in the cabin 22 of the aircraft 10 (see FIG. 1). The method 400 further comprises step 408 of retracting the magnetic curtain 50 to the retracted position 28 so that the hemmed portions 56 are held together by the magnets 58, and so that the one or more emergency exit locator signs 32 in the cabin 22 of the aircraft 10 are visible to occupants 36 of the aircraft 10 approaching the one or more emergency exit locator signs 32 along an aisle 34 of the aircraft 10 (see FIG. 1).

One or more of the embodiments of the hanging partition and methods of the disclosure provides numerous advantages. The disclosed embodiments provide for a hanging partition, preferably in the form of a magnetic curtain, that allows for an automatic, hands-free stack-up of the magnetic curtain when the magnetic curtain is moved to a retracted position. When the magnetic curtain is neatly stacked up, the magnetic curtain hangs straight, and the magnetic curtain does not obstruct any emergency exit locator sign or signs in close proximity to the magnetic curtain, thus facilitating the visibility of the emergency exit locator sign or signs to occupants of a vehicle such as an aircraft. This can also reduce possible violations of FAR regulations involving emergency exit signs, such as 14 C.F.R. Section 25.811(d). The automatic, hands-free stack-up of the magnetic curtain also decreases the workload of the flight crew as they do not have to spend added time arranging the curtain so that the stack-up is neatly stacked. The automatic, hands-free stack-up of the magnetic curtain frees up the flight crew to be able to accomplish other tasks. Functionally, the magnetic curtain automatically closes when attempting to stow or retract when the aircraft takes off, lands, and taxis on the runway. When the magnetic curtain needs to be expanded or opened, the magnets can easily release away each other to fully expand the magnetic curtain.

EXAMPLE

An aircraft curtain with magnets according to one of the embodiments of the disclosure was assembled and compared to a known aircraft curtain without magnets. All data was recorded with only one assembled magnetic curtain and one aircraft curtain. Both curtains were made of an FAA flammability approved wool material. The weight of the aircraft curtain with magnets was 2.81 pounds, and the weight of the stack of magnets used was 1.1 pounds. The weight of the aircraft curtain without magnets was 2.73 pounds. The thickness of the stack-up across the retracted aircraft curtain with magnets (including glider elements) was 5.8125 inches. The thickness of the stack-up across the retracted aircraft curtain without magnets (including glider elements) was 6.375 inches. Both stack-up measurements were even at 5.5 inches, that is, the stack-up that was manually pressed together was the same measurement as the stack-up that had magnets. The appearance of the stack-up of the aircraft curtain with magnets was neat when in the retracted position. The appearance of the stack-up of the aircraft curtain without magnets was loose when in the retracted position. The aircraft curtain with magnets and the aircraft curtain without magnets were both retracted and expanded four (4) times, and the aircraft curtain with magnets required less work to retract and expand than the aircraft curtain without magnets.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A hanging partition for a cabin of an aircraft comprising:
at least one flexible, hanging panel having a plurality of pleats, each pleat having a hemmed portion with an opening at a top end of an upper portion of the hanging panel, each opening being in close proximity to a cabin ceiling of the cabin of the aircraft;
one or more magnets positioned within each of two or more of the hemmed portions and only positioned at the top end of the upper portion of the hanging panel; and,
a plurality of hanging elements for suspending the hanging panel from a longitudinal hanging device,
wherein all the magnets are vertically aligned with respect to each other to cause a magnetic attraction between adjacent magnets in order to hold the plurality of pleats together when the hanging partition is in a retracted position, the magnets being laterally stacked within and across only the upper portion when the hanging partition is in the retracted position.

2. The hanging partition of claim 1, wherein the hanging partition is a curtain.

3. The hanging partition of claim 1, wherein the hanging partition is made of a material selected from the group consisting of flame resistant fabric material including a flame resistant wool material, a flame resistant polyester material, and a flame resistant nylon material.

4. The hanging partition of claim 1, wherein the one or more magnets are positioned in alternating hemmed portions of the plurality of pleats, or in randomly selected hemmed portions of the plurality of pleats.

5. The hanging partition of claim 1, wherein each hemmed portion further comprises at least one pocket for holding one or more of the magnets.

6. The hanging partition of claim 1, wherein the magnets are aligned with respect to each other such that a north pole surface of one magnet is aligned with a south pole surface of the adjacent magnet so as not to repel each other.

7. The hanging partition of claim 4, wherein the magnets are aligned with respect to each other to automatically stack the hemmed portions together when the hanging partition is in the retracted position.

8. The hanging partition of claim 1, wherein the magnets are made of a material selected from the group consisting of a magnetic material including neodymium, neodymium iron boron, hard ferromagnetic material, samarian cobalt, alnico, ceramic, ferrite, iron, nickel, and alloys of rare earth metals.

9. The hanging partition of claim 1, wherein the hanging element comprises a glider element.

10. The hanging partition of claim 1, wherein each hanging element has a first end coupled to the longitudinal hanging device, and each hanging element has a second end coupled to the hemmed portion of each pleat via an attachment element.

11. The hanging partition of claim 1, wherein the hanging partition partitions at least two areas in the cabin of the aircraft.

12. The hanging partition of claim 1, wherein when the hanging partition is in the retracted position, the hanging partition hangs straight.

13. The hanging partition of claim 1, wherein when the hanging partition is in the retracted position, the hanging partition does not obstruct an emergency exit locator sign in proximity to the hanging partition in the aircraft.

14. A magnetic curtain for partitioning at least two areas in a cabin of an aircraft, the magnetic curtain comprising:
at least one curtain panel made of a flame resistant material and having a plurality of pleats, each pleat having a hemmed portion with an opening at a top end of an upper portion of the curtain panel, each opening being in close proximity to a cabin ceiling of the cabin of the aircraft;
at least one magnet positioned within each of two or more of the hemmed portions and only positioned at the top end of the upper portion of the curtain panel, wherein the magnet is made of a material selected from the group consisting of a magnetic material including neodymium, neodymium iron boron, hard ferromagnetic material, samarian cobalt, alnico, ceramic, ferrite, iron, nickel, and alloys of rare earth metals and,
a plurality of glider elements for suspending the curtain panel from a longitudinal curtain rail, each glider element having a first end coupled to the curtain rail, and each glider element having a second end configured for insertion through the opening of the hemmed portion and configured for coupling to the hemmed portion of each pleat via an attachment element,
wherein all the magnets in adjacent pleats are vertically aligned with respect to each other to cause a magnetic attraction between the adjacent magnets in order to hold the magnetic curtain in a retraced position, the magnets being laterally stacked within and across only the upper portion when the magnetic curtain is in the retracted position, and the magnetic curtain not obstructing any emergency exit locator signs in proximity to the magnetic curtain when the magnetic curtain is in the retracted position.

15. A method of assembling a hanging partition for a cabin of an aircraft, the method comprising:
providing a hanging panel having a plurality of pleats, each pleat having a hemmed portion with an opening at a top end of an upper portion of the hanging panel, each opening being in close proximity to a cabin ceiling of the cabin of the aircraft;
positioning one or more magnets within each of two or more of the hemmed portions and only positioned at the top end of the upper portion of the hanging panel;
vertically aligning all the magnets in order to cause a magnetic attraction between adjacent magnets and in order to automatically stack the plurality of pleats together laterally within and across only the upper portion when the hanging partition is in a retracted position; and,
attaching to the hanging panel a plurality of hanging elements for suspending the hanging partition from a longitudinal hanging device.

16. The method of claim 15, wherein the hanging partition is a curtain and the hanging panel is a curtain panel.

17. The method of claim 15, wherein the hanging partition partitions at least two areas in the cabin of the aircraft.

18. The method of claim 15, wherein each hemmed portion further comprises at least one pocket for holding one or more of the magnets.

19. The method of claim 15, wherein the hanging partition does not obstruct an emergency exit locator sign in proximity to the hanging partition, when the hanging partition is in the retracted position.

20. The method of claim 15, wherein the hanging elements comprise glider elements and the hanging device comprises a curtain rail.

21. A method of assembling a magnetic curtain for partitioning at least two areas in a cabin of an aircraft, the method comprising:

providing a flame resistant curtain panel having a plurality of pleats, each pleat having a hemmed portion with an opening at a top end of an upper portion of the curtain panel, each opening being in close proximity to a cabin ceiling of the cabin of the aircraft;

inserting through the opening of each hemmed portion at least one magnet at the top end of only the upper portion of the curtain panel;

vertically aligning the magnets in order to cause a magnetic attraction between adjacent magnets and in order to automatically stack the plurality of pleats together laterally within and across only the upper portion, when the magnetic curtain is in a retracted position; and, attaching to the curtain panel a plurality of glider elements for suspending the magnetic curtain from a longitudinal curtain rail, each glider element having a first end coupled to the curtain rail, and each glider element having a second end configured for insertion through the opening of the hemmed portion and configured for coupling to the hemmed portion of each pleat via an attachment element.

22. A method for facilitating visibility of one or more emergency exit locator signs in a cabin of an aircraft, the method comprising:

providing a flame resistant curtain panel having a plurality of pleats, each pleat having a hemmed portion with an opening at a top end of an upper portion of the curtain panel, each opening being in close proximity to a cabin ceiling of the cabin of the aircraft;

vertically aligning one or more magnets within each of two or more of the hemmed portions and positioning the one or more magnets at the top end of only the upper portion of the curtain panel in order to cause a magnetic attraction between adjacent magnets;

suspending the magnetic curtain from a longitudinal curtain rail with a plurality of hanging elements, such that the magnetic curtain partitions at least two areas in the cabin of the aircraft; and, retracting the magnetic curtain to a retracted position so that the plurality of pleats are held together by the magnets and automatically stacked together laterally within and across only the upper portion, and so that the one or more emergency exit locator signs in the cabin of the aircraft are visible to occupants of the aircraft approaching the one or more emergency exit locator signs along an aisle of the aircraft.

* * * * *